Patented July 1, 1930

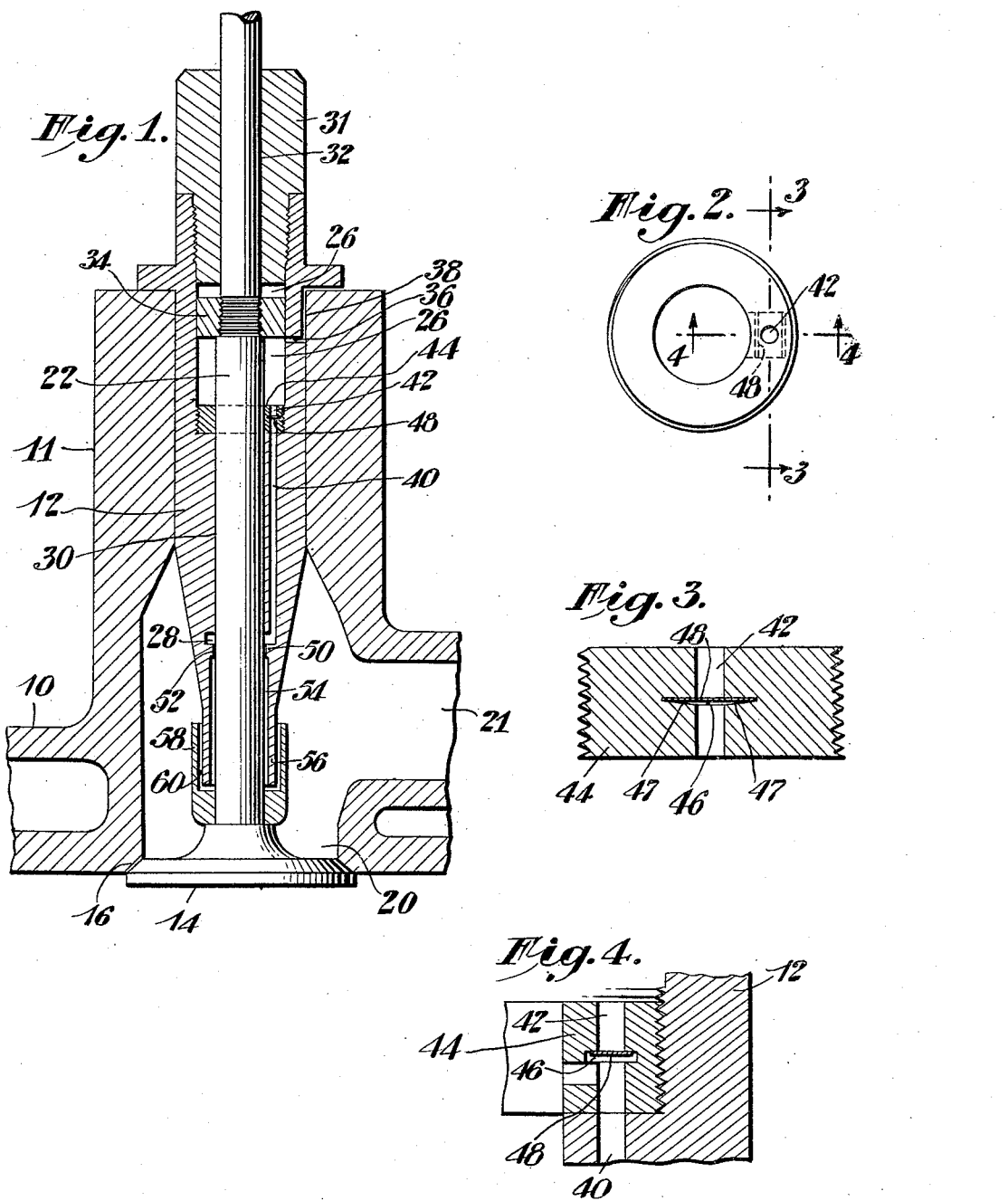

1,769,672

UNITED STATES PATENT OFFICE

THOMAS S. BLAIR, OF BROOKLYN, NEW YORK, ASSIGNOR TO DOHERTY RESEARCH COMPANY, OF NEW YORK, N. Y., A CORPORATION OF DELAWARE

SELF-CLEANING VALVE STEM

Application filed September 29, 1927. Serial No. 222,708.

In my Patent No. 1,731,222, Oct. 8, 1929, I have disclosed a valve for handling high temperature gases and having means whereby air under pressure may be forced along the surface of the valve stem to prevent the stem from sticking or seizing in the valve head or sleeve in which the stem is mounted.

The present invention relates to an improvement on the arrangement in my said application and has as one of its objects the provision of a self-contained and simple arrangement whereby the operation of the valve automatically compresses air for use in preventing seizing of the valve stem.

The present invention together with further objects and advantages thereof will be understood by those skilled in the art from the following description taken in connection with the accompanying drawing, in which:

The Fig. 1 is a longitudinal section through a portion of the head of an internal combustion engine in which a valve construction according to the present invention has been mounted;

Fig. 2 is a plan view of a collar appearing in Fig. 1;

Fig. 3 is a section on the line 3—3 of Fig. 2 looking in the direction of the arrows;

Fig. 4 is a section on line 4—4 of Fig. 2, looking in the direction of the arrows.

In the drawing, 10 is the head of an internal combustion engine cylinder and having a boss 11 in which is mounted a valve sleeve 12 for supporting the valve 14. Valve 14 is either an admission, a transfer, or an exhaust valve. The seat 16 for the valve 14 is preferably of the water cooled type, seat 16 being illustrated as being formed directly on the head 10. The illustration of the valve seat will be understood, however, to be diagrammatic, the present invention not residing in the form of seats and not being limited to any special form of seat. The seat 16 has a port 20 therethrough, flow of gases through duct 20 being controlled by the valve 14. Port 20 connects with duct 21 through which gases issuing from port 20 pass to the exhaust or to another cylinder.

Valve 14 has a stem 22 mounted to reciprocate in a bore in the valve stem 12. The sleeve 12 is recessed to provide two chambers 26 and 28 respectively surrounding the stem 22. Chambers 26 and 28 are spaced apart and between these two chambers the sleeve 24 has a guiding surface 30 making an ordinary guiding fit with stem 22. For closing chamber 26 the upper or outer end of sleeve 12 carries a threaded plug 31 having a surface 32 making a guiding fit with stem 22. It will be understood that in general the ordinary guiding fit requires that the inner diameter of surfaces 30 and 32 shall be one one-thousandth inches greater in diameter than the external diameter of the valve stem 22. The stem 22 has a plunger or piston 34 affixed thereto and arranged, when the valve 14 is closed against the seat, to rest in the upper portion of chamber 26. Piston 34 has a close fit with the inner face of chamber 26 so that piston 34 can compress air when reciprocated in chamber 26. The piston 34 forms part of means according to the present invention for preventing the valve stem 22 from sticking or seizing in the sleeve 12. The valve 14 being designed for controlling gases of high temperature, special means are required to prevent the hot gases from working along the surface of the valve stem from the port 20 and carbonizing the oil needed to lubricate the guide surfaces of the stem. If the oil is carbonized, the stem 22 is apt to stick or seize in surfaces 30 and 32 so as to render the valve stem inoperative. No practical enlargement of the bore in which valve stem 22 operates serves to avoid the difficulty. If the size of the bore in which the stem operates is increased sufficiently to prevent the seizing of the valve, the gases then escape around the valve stem.

The means according to the present invention for preventing seizing of the stem in its guiding surfaces includes, in addition to said piston in said chamber, means whereby the movement of piston 34 in chamber 26 forces air or other fluid into chamber 28 and thence along the surface of the valve stem 22 between the chamber 28 and the valve 14. To permit the operation just mentioned, the sleeve 12 has a small hole 36 therein connecting at its inner end with said chamber 26 and connecting at its outer end with a groove 38 in the outer surface of boss 11, groove 38 connecting the hole 36 with the atmosphere at the surface of the boss 11. When the stem 22 and piston 34 are in the position illustrated in the drawing, the lower edge of piston 34 is just above the inner end of hole 36 so that air can pass freely into the chamber 26. When the hole 36 is uncovered, as just mentioned, the valve 14 is closed and rests against its seat. As soon as valve 14 begins to open, however, the piston 34 covers the inner end of hole 36 thereby trapping air in the chamber 26. Further movement of the piston 34 forces air from chamber 26 through duct 40 in the sleeve 12 and into the chamber 28. In passing from the chamber 26 into duct 40, the air goes through an opening 42 in a collar 44 mounted in the lower end of the chamber 26. The bore 42 is enlarged at 46 to form a valve chamber or pocket within which is mounted a strip 48 of spring steel acting as a check valve or non-return valve preventing air which has entered chamber 46 from passing back into chamber 26. The details of chamber 46 and valve 48 are illustrated more particularly in Figs. 2, 3 and 4. The upper face or top of chamber 46 is flat, but the bottom of chamber 46 inclines upwardly at its ends as illustrated at 47, 47, inclined surfaces 47 extending up to intersect with the top of chamber 46 at its two ends. The strip 48 is of such length that, when fully extended, its ends are pressed against the inclined lower surfaces 47 at the ends of the chamber or recess 46 and the strip 48 is thereby pressed up against the upper face of the recess 46 so as to cover the duct 42. When, owing to the movement of the piston 34, compressed air is forced against the spring 48, the spring bulges downwardly at its center, thereby permitting the air to pass around its edges and pass into the chamber 46, thence through the remainder of duct 42 to duct 40. As clearly illustrated in Fig. 4, the spring 48 is narrower than the chamber 46 whereby the air may escape readily around the edges of the spring valve 48 as just described.

It will be seen that the piston 34, chamber 26 and valve 48 form a pump acting automatically upon the reciprocation of the valve 14 and stem 22 to force fluid down into the chamber 28.

Below the chamber 28, the valve sleeve 12 contracts around the stem 22 in a face 50 having a limited length in the direction parallel to the axis of stem 22. Face 50 is not a guiding face, its internal diameter being approximately three one-thousandths inches greater than the external diameter of stem 22. A restricted discharge passage 52 is thereby formed along the face of valve stem 22 immediately below chamber 28 whereby air may escape from chamber 28 in a thin film and pass downwardly along the surface of the stem 28 toward the valve 14. Below the face 50, the valve sleeve 12 is further relieved forming a passage 54 for the downward discharge of air. The lower end of sleeve 12 is reduced in outside diameter to form a thin cylindrical skirt 56 surrounding the lower portion of the stem 22 and the valve 14 has an upwardly extending cylindrical piece or collar 58 affixed thereon which surrounds the skirt 56 and forms therewith a passage 60 acting as an extension of the passage 54 whereby air which has passed downwardly from chamber 28 through passage 54 is reversed in its flow and passes upwardly again to discharge into the gas duct 21 at the upper end of the collar 58.

It will be clear from the foregoing that, when the valve 14 is seated, the lower end of the stem 22 is protected from absorbing heat from the surrounding gases by contact or by radiation by two metal surfaces and two layers of air. Also it will be seen that the action of valve 14, in opening and closing, automatically forces fluid along a section of the surface of the stem 22 lying between the guiding surfaces and the valve, thereby preventing hot gases from working their way into the film of lubricating oil on the guiding surfaces. Cracking of the lubricant and consequent seizing of the stem is thereby effectively prevented.

While I have illustrated and above described a specific arrangement of a valve and means for forcing a fluid along the valve stem to prevent seizing of the stem, it will be understood that the present invention is not limited to details of form, construction or arrangement herein disclosed except in so far as such details are clearly and positively included in the appended claims.

Having thus described my invention I claim:

1. The combination of a valve sleeve, a valve having a stem mounted in said sleeve, said sleeve having a surface guiding said stem, said sleeve and stem being so constructed and arranged that said stem may reciprocate in said sleeve, and means whereby the reciprocation of said stem forces fluid along the surface of a portion of said stem lying intermediate said guide surface and said valve.

2. The combination of a valve sleeve, a valve having a stem mounted in said sleeve, said sleeve having a surface guiding said stem, said sleeve and stem being so constructed and arranged that said stem may reciprocate in said sleeve, said sleeve having a pump chamber therein, a piston on said stem within said chamber, and means whereby reciprocation of said stem and piston forces air between said sleeve and stem and along the surface of a portion of said stem lying intermediate said guide surface and said valve.

3. In an internal combustion engine, a valve sleeve having a pump chamber therein, a valve having a stem mounted in said sleeve and passing through said chamber, and a collar mounted in said chamber and surrounding said stem, said collar having a valve pocket therein, and a check valve mounted in said pocket.

4. In a device of the class described, a valve chamber having a flat wall provided with an inlet and having a wall opposite said flat wall, said opposite wall having end portions inclined to intersect said flat wall, and a normally flat resilient valve member having its end portions normally in contact with said inclined wall portions whereby the valve member is normally held against said flat wall, said valve member being narrower than said chamber, whereby fluid may pass around the lateral edges of the member.

5. In a device of the class described, a valve chamber having a flat wall provided with an inlet and having a wall opposite said flat wall, said opposite wall having end portions inclined to intersect said flat wall and a centrally flat resilient valve member having its end portions normally sustained by said inclined wall portions whereby the valve member is normally held against said flat wall, said valve member being narrower than said chamber, whereby fluid may pass around the lateral edges of the member.

6. The combination of a valve sleeve, a valve having a stem mounted in said sleeve, said sleeve having a surface guiding said stem, said sleeve and stem being so constructed and arranged that said stem may reciprocate in said sleeve, said sleeve having a pump chamber therein, a piston on said stem within said pump chamber, and means whereby a portion of said stem lying intermediate said guide surface and said valve is bathed in fluid forced between said sleeve and said stem by the reciprocation of said stem and said piston.

7. The combination of a valve sleeve, a valve having a stem mounted in said sleeve, said sleeve having a surface guiding said stem, said sleeve and stem being so constructed and arranged that said stem may reciprocate in said sleeve, said sleeve having a pump chamber therein, a piston on said stem within said pump chamber, an air passage from said chamber extending the length of said guiding surface terminating in a clearance space about said stem and within said sleeve, a restricting band projecting toward said stem from said sleeve below said clearance space and clearance below said restricting band between said sleeve and said stem, and means whereby reciprocation of said stem and piston blasts air about said stem past said restricting band and through said lower clearance.

8. The combination of a valve sleeve, a valve having a stem mounted in said sleeve, said sleeve having a surface guiding said stem, said sleeve and stem being so constructed and arranged that said stem may reciprocate in said sleeve, said sleeve having a pump chamber therein, a piston on said stem within said pump chamber, a passage from said chamber extending to a point intermediate said guiding surface and said valve, a check valve in said passage permitting the flow of fluid from said chamber and preventing the return flow of fluid thereto.

In testimony whereof I affix my signature.

THOMAS S. BLAIR.